L. E. YOUNGQUIST.
SELF STEERING MECHANISM FOR TRACTION ENGINES.
APPLICATION FILED AUG. 20, 1912.
1,081,881.
Patented Dec. 16, 1913.
2 SHEETS—SHEET 1.
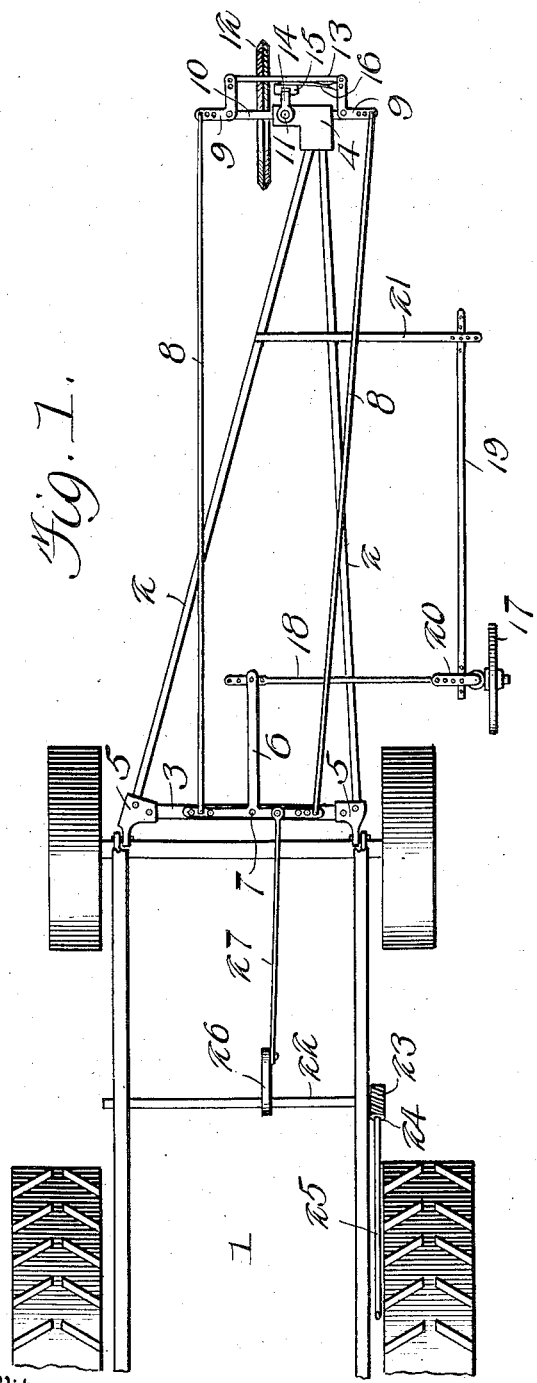
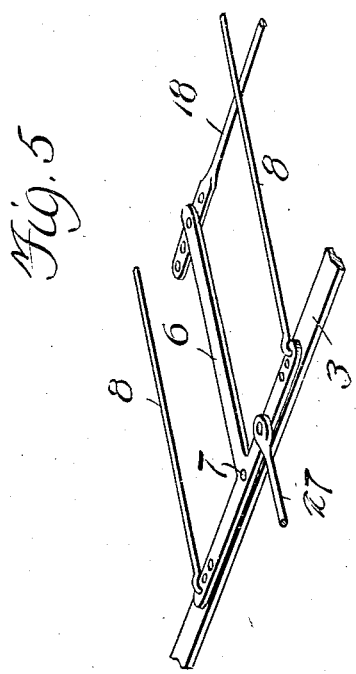
Witnesses
Harrison Ott
K Allen
Inventor
L. E. Youngquist
By Victor J. Evans
Attorney

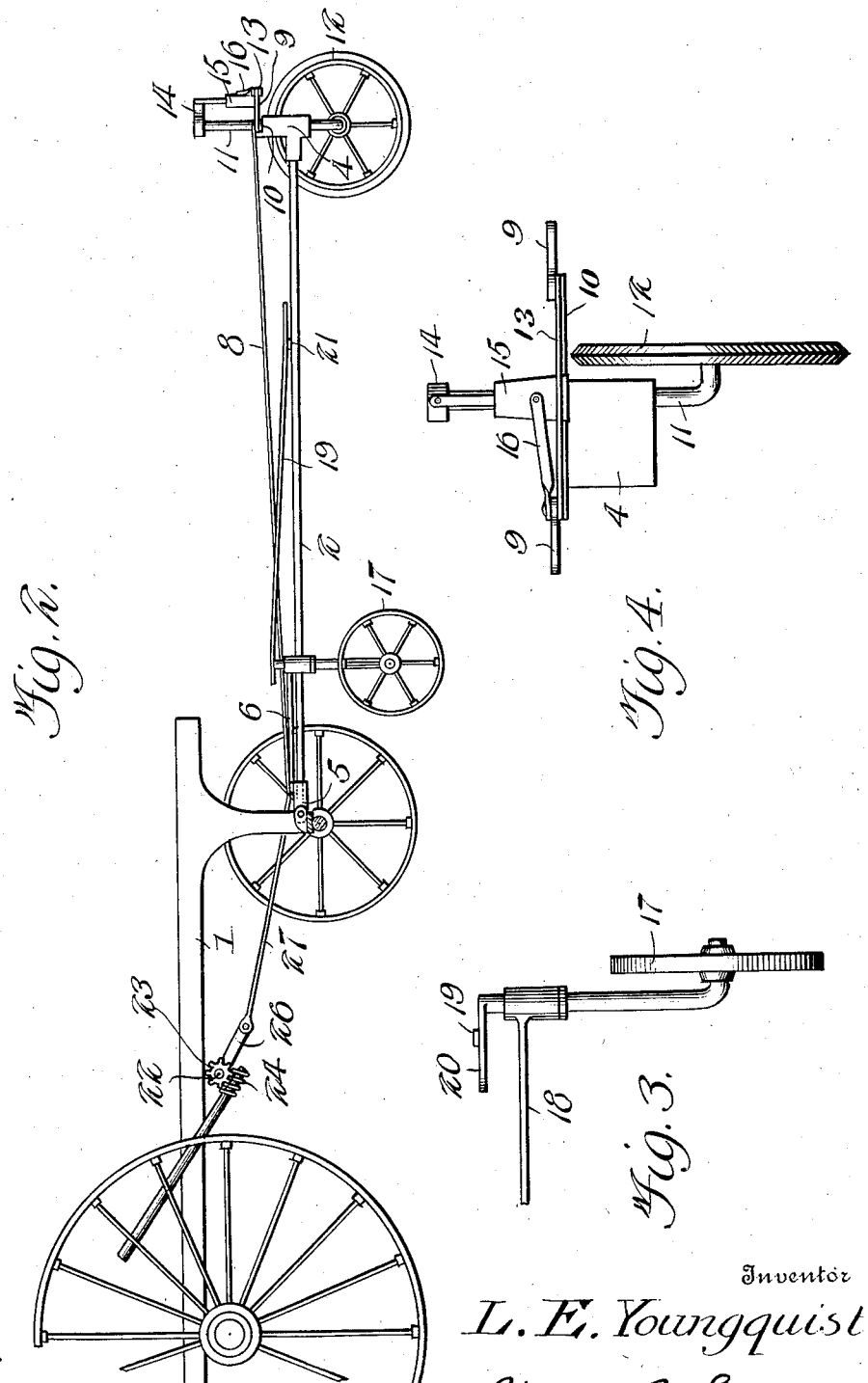

UNITED STATES PATENT OFFICE.

LAWRENCE E. YOUNGQUIST, OF GLENDIVE, MONTANA.

SELF-STEERING MECHANISM FOR TRACTION-ENGINES.

1,081,881.   Specification of Letters Patent.   Patented Dec. 16, 1913.

Application filed August 20, 1912. Serial No. 716,044.

*To all whom it may concern:*

Be it known that I, LAWRENCE E. YOUNGQUIST, a citizen of the United States, residing at Glendive, in the county of Dawson and State of Montana, have invented new and useful Improvements in Self-Steering Mechanism for Traction-Engines, of which the following is a specification.

This invention has relation to steering gear for traction engines and like machines whereby the engine may be caused to travel in a proper course which is of advantage when plowing a field, since the furrows may be uniformly placed.

The invention provides a steering mechanism which may be fitted to any machine or traction engine and which when set will automatically direct the engine, the steering wheel being governed in its movement by means of a furrow runner and a pendulum.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a top plan view of the running gear of a traction engine or like machine and an automatic steering mechanism fitted thereto and embodying the essential features of the invention. Fig. 2 is a detail view in side elevation. Fig. 3 is a front view of the steering mechanism. Fig. 4 is a detail view of the furrow runner and adjunctive parts. Fig. 5 is a detail perspective view of the T lever and the several connections pivoted thereto.

Corresponding and like parts are referred to in the following description, and indicated in all the views of the drawings, by the same reference characters.

The main frame 1 of the running gear of a traction engine or analogous machine may be of any ordinary construction and has the frame of the automatic steering mechanism pivotally connected to the front axle so that the latter and the frame of the steering mechanism will turn as one part. The frame of the steering mechanism comprises longitudinal bars 2, a rear cross bar 3, a front casting 4 and rear castings 5, the latter being pivotally connected to the front axle of the engine in any manner. A T lever 6 is pivotally connected at 7 to the rear cross bar 3 of the steering frame. Rods or bars 8 connect the outer ends of the horizontal arms of the T lever with the horizontal arms of bell cranks 9 pivoted to the ends of a cross bar 10, secured to the vertical stem 11 of the steering wheel support, which is mounted in the casting 4. The lower end of the stem 11 has a horizontal arm upon which the steering wheel 12 is mounted, the edge of such steering wheel being of V form so as to prevent slipping. The longitudinal arms of the bell cranks 9 are connected by means of a rod 13. An arm 14 is secured to the upper portion of the stem 11 and extends forwardly therefrom and supports a pendulum 15, the lower end of which is connected by means of a link 16 with the longitudinal arm of one of the bell cranks 9. When the pendulum 15 hangs vertically the steering wheel 12 is in line with the engine so as to direct the same straight ahead. Should the pendulum tend to incline either to the right or to the left by the engine passing over rolling ground the bell cranks 9 will be turned and cause the steering wheel 12 to turn and direct the machine either to the right or to the left, as may be required to obtain the desired result.

The furrow runner 17 preferably consists of a wheel which is arranged to travel in the furrow or like guiding trench. A rod or bar 18 forms a support for the furrow runner and has adjustable connection at its inner end with the longitudinal arm or member of the T lever 6 so that the furrow runner may be arranged at a greater or less distance from the frame of the steering mechanism according to the required distance between the furrows. When the engine is traveling parallel with the guiding furrow or trench the steering wheel 12 points straight ahead, but should the engine move toward or away from the line of the guiding furrow or trench the furrow runner will through the connection 18 turn the T lever 6 and through the intermediate connections move the steering wheel 12, thereby bringing the engine back to the proper course, which is parallel with the guiding furrow.

The furrow runner 17 is automatically turned when the engine departs from a proper course, thereby keeping the furrow runner straight with the furrow or trench so it will not tend to leave the same. This is accomplished by means of a rod 19 attached at its rear end to an arm 20 projecting from the stem of the furrow support, said rod being adjustably connected at its front end to a bar 21 secured to the frame of the steering mechanism and projecting laterally therefrom.

The engine or machine is adapted to be steered in the usual manner by means of a shaft 22 mounted upon the frame 1 and provided with a worm wheel 23, which is engaged by means of a worm 24 on the steering shaft 25. An arm 26 secured to the shaft 22 is connected by means of a rod 27 with one of the horizontal arms of the T lever 6.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. In a steering mechanism, the combination of a steering wheel and a pendulum having connection with the steering wheel to automatically turn the same to keep the machine in a proper course.

2. A frame adapted to be connected to the steering axle of a traction engine or other machine, a steering wheel mounted upon the front portion of the steering frame, and a pendulum mounted upon the steering frame and having connection with the steering wheel to keep the latter in a proper course when the machine tilts upon passing over rolling ground.

3. In combination with the frame of a traction engine or other machine, a steering gear frame having pivotal connection with the frame of the machine, a steering wheel mounted upon the steering frame, a pendulum having connection with the steering wheel, a furrow runner, and connecting means between the furrow runner and the steering wheel.

4. In automatic steering mechanism the combination of a T lever, oppositely disposed bell cranks, connecting means between the horizontal arms of the bell cranks and the horizontal arms of the T lever, connecting means between the longitudinal arms of the bell cranks, a steering wheel, connecting means between the steering wheel and one of said bell cranks, a furrow runner, and connecting means between the furrow runner and the longitudinal arm of the T lever.

5. In automatic steering mechanism the combination of a T lever, oppositely disposed bell cranks, connecting means between the horizontal arms of the bell cranks and the horizontal arms of the T lever, a steering wheel, connecting means between the steering wheel and the longitudinal arms of the bell cranks, a furrow runner, supporting means for the furrow runner having connection with the longitudinal arm of the T lever, and an adjustable connection between such furrow runner and the main frame supporting the operating parts of the steering mechanism.

In testimony whereof I affix my signature in presence of two witnesses.

LAWRENCE E. YOUNGQUIST.

Witnesses:
　HANS H. HELLAND,
　ED HOLMBERG.